US009887052B1

(12) United States Patent
Lin et al.

(10) Patent No.: US 9,887,052 B1
(45) Date of Patent: Feb. 6, 2018

(54) LIGHT GUIDE PLATE AND LIGHT EMITTING KEYBOARD HAVING THE SAME

(71) Applicant: SUNREX TECHNOLOGY CORP., Taichung (TW)

(72) Inventors: Shih-Pin Lin, Taichung (TW); I-Ting Wang, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 15/371,573

(22) Filed: Dec. 7, 2016

(51) Int. Cl.
*H01H 9/26* (2006.01)
*H01H 13/83* (2006.01)
*F21V 8/00* (2006.01)

(52) U.S. Cl.
CPC ........... *H01H 13/83* (2013.01); *G02B 6/0078* (2013.01); *H01H 2219/036* (2013.01); *H01H 2219/062* (2013.01)

(58) Field of Classification Search
CPC ............. H01H 13/83; H01H 2219/036; H01H 2219/062; H01H 13/023; G02B 6/0078
USPC .......................................... 200/313, 314, 311
See application file for complete search history.

(56) References Cited

U.S. PATENT DOCUMENTS 8,592,702 B2 * 11/2013 Tsai ...................... G06F 3/0202 200/296
8,714,850 B2 * 5/2014 Ho ......................... H01H 3/125 200/314
9,269,509 B2 * 2/2016 Ho ......................... H01H 3/125
9,633,803 B2 * 4/2017 Wang ................... H01H 13/023
2010/0065408 A1 * 3/2010 Chiang .................. H01H 13/83 200/314
2010/0252405 A1 * 10/2010 Chen ..................... G06F 3/0202 200/314
2010/0271839 A1 * 10/2010 Chan ...................... H01H 13/83 362/602
2011/0162944 A1 * 7/2011 Liu ........................ G06F 1/1662 200/314
2014/0326589 A1 * 11/2014 Shiu ....................... H01H 13/83 200/5 A

FOREIGN PATENT DOCUMENTS

| | | | |
|---|---|---|---|
| CN | 201780913 | U | 3/2011 |
| CN | 103413714 | A | 11/2013 |
| CN | 105487168 | A | 4/2016 |
| TW | M525536 | U | 7/2016 |
| TW | M525536 | U | 7/2016 |

* cited by examiner

*Primary Examiner* — Kyung Lee
(74) *Attorney, Agent, or Firm* — Muncy, Geissler, Olds & Lowe, P.C.

(57) ABSTRACT

A light guide plate includes a light shielding plate body, a light guide plate body and a plurality of light source receiving spaces. The light shielding plate body includes a peripheral frame, a plurality of longitudinal and transverse partition strips provided in the peripheral frame, and a plurality of light guide regions cooperatively defined by the peripheral frame and the longitudinal and transverse partition strips. The light guide regions are configured to respectively align with the keys. The light guide plate body includes a plurality of light guide blocks embedded in the light guide regions, respectively. The light source receiving spaces correspond to the light guide blocks.

10 Claims, 7 Drawing Sheets

LIGHT GUIDE PLATE AND LIGHT EMITTING KEYBOARD HAVING THE SAME

FIELD

The disclosure relates to a keyboard, and more particularly to a light emitting keyboard and a light guide plate thereof.

BACKGROUND

FIG. 1 illustrates a light guide plate 9 of a light emitting keyboard, as disclosed by the applicant in Taiwanese Patent No. M525536. The light guide plate 9 is composed of a plurality of light guide blocks 91, each of which has a plurality of spaced-apart light blocking spaces 912 dividing the light guide block 91 into a plurality of light guide portions 911, and a plurality of light source receiving spaces 913 corresponding to the light guide portions 911 and respectively receiving the light sources (not shown). The light guide portions 911 correspond to the keys (not shown) of the light emitting keyboard. The light blocking spaces 912 are used to restrict light emitted from each light source to transmit within a respective one of the light guide portions 911. Through this, the luminance of each light guide portion 911 is controlled by a single light source, and is not affected by the other light sources. Hence, the luminance of the light guide portions 911 is uniform and approaches the luminance of each light source, and the luminance of light transmissive portions of the keys is also uniform.

However, since the light blocking spaces 912 can only prevent light emitted from each light source to transmit to a neighboring light guide portion 911, light emitted from the light sources in each light guide block 91 can still leak through a peripheral side thereof, so that the brightness of light emitted by each light guide portion 911 to the corresponding key is weakened, thereby reducing the light utilization efficiency of each light source. Further, although an outer frame (not shown) can be used to interconnect six rows of the light guide blocks 91 of the light guide plate 9, clearances among the light guide blocks 91 still exist. Moreover, each light guide block 91 has the light blocking spaces 912, so that the structural strength of the entire light guide plate 9 is weak, that is, each light guide block 91 is easily bent by an external force that causes the entire light guide plate 9 to warp, thereby adversely affecting the degree of closeness of the light guide plate 9 with the other components of the light emitting keyboard during assembly. Hence, there is still room for improvement of the light guide plate 9.

SUMMARY

Therefore, an object of the present disclosure is to provide a light emitting keyboard and a light guide plate thereof that can alleviate at least one of the drawbacks of the prior art.

According to one aspect of this disclosure, a light guide plate is configured to be disposed on a bottom side of a keyboard module having a plurality of keys, and comprises a light shielding plate body, a light guide plate body and a plurality of light source receiving spaces. The light shielding plate body includes a peripheral frame, a plurality of longitudinal and transverse partition strips provided in the peripheral frame, and a plurality of light guide regions cooperatively defined by the peripheral frame and the longitudinal and transverse partition strips. The light guide regions are configured to respectively align with the keys.

The light guide plate body includes a plurality of light guide blocks embedded in the light guide regions, respectively. The light source receiving spaces correspond to the light guide blocks.

According to another aspect of this disclosure, a light emitting keyboard includes a keyboard module and a backlight module. The keyboard module includes a base plate, and a plurality of keys disposed on a top surface of the base plate and movable upward and downward relative to the base plate. The base plate has a plurality of through holes corresponding to the keys. The keys are located respectively above the through holes. Each key has at least one light transmissive portion facing a corresponding one of the through holes. The backlight module is disposed on a bottom surface of the base plate and includes a light guide plate and a light emitting unit. The light guide plate has a light shielding plate body, a light guide plate body and a plurality of light source receiving spaces. The light shielding plate body includes a peripheral frame, a plurality of longitudinal and transverse partition strips provided in the peripheral frame, and a plurality of light guide regions cooperatively defined by the peripheral frame and the longitudinal and transverse partition strips. The light guide regions are configured to respectively align with the keys. The light guide plate body includes a plurality of light guide blocks embedded in the light guide regions, respectively. The light source receiving spaces correspond to the light guide blocks. The light emitting unit includes a plurality of light sources respectively received in the light source receiving spaces.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
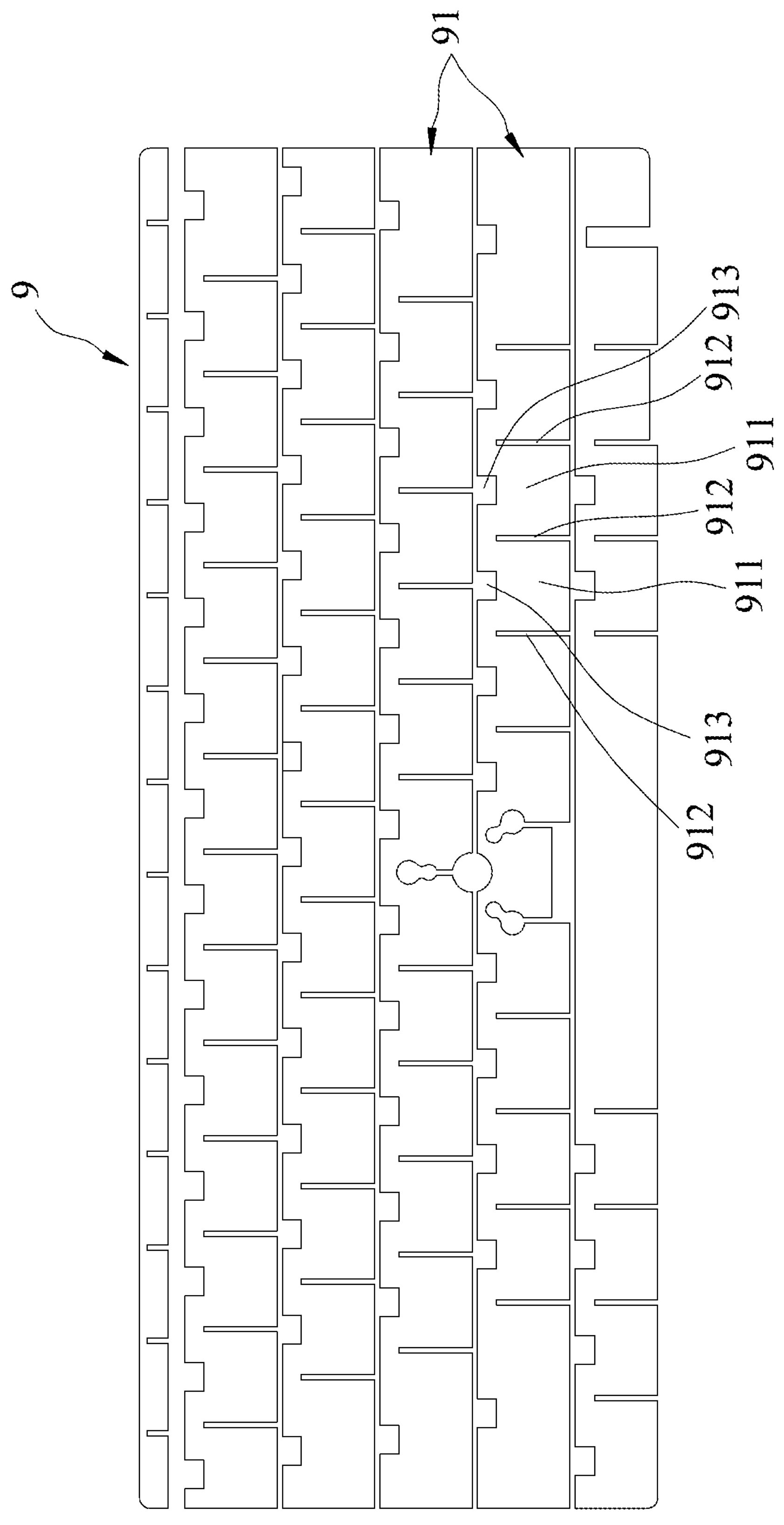
FIG.1 PRIOR ART
FIG. 1 is a top view of a light guide plate of a light emitting keyboard disclosed in Taiwanese Patent No. M525536.
Figure 2:
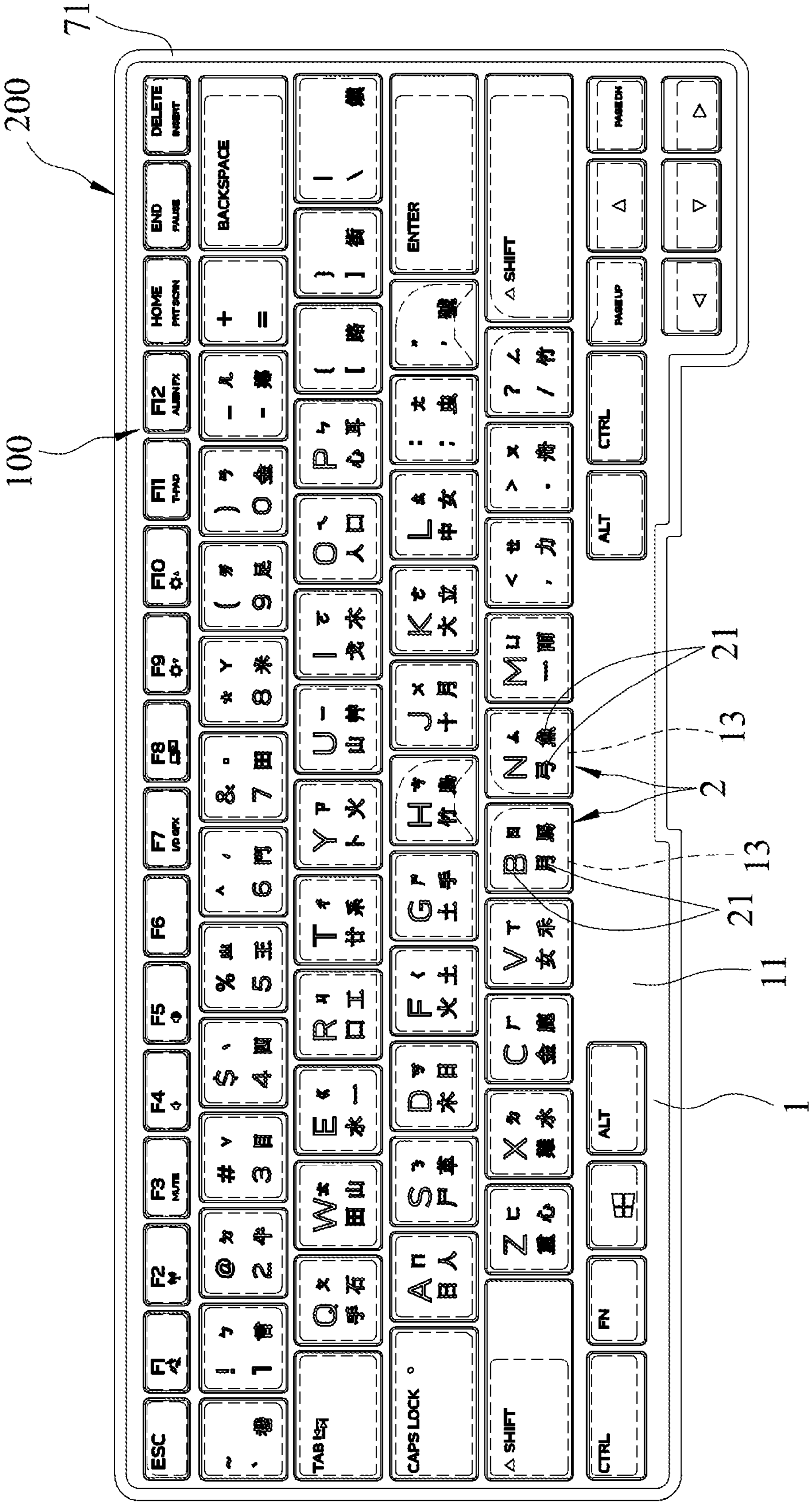
FIG. 2 is a top view of a light emitting keyboard according to an embodiment of the present disclosure.
Figure 3:
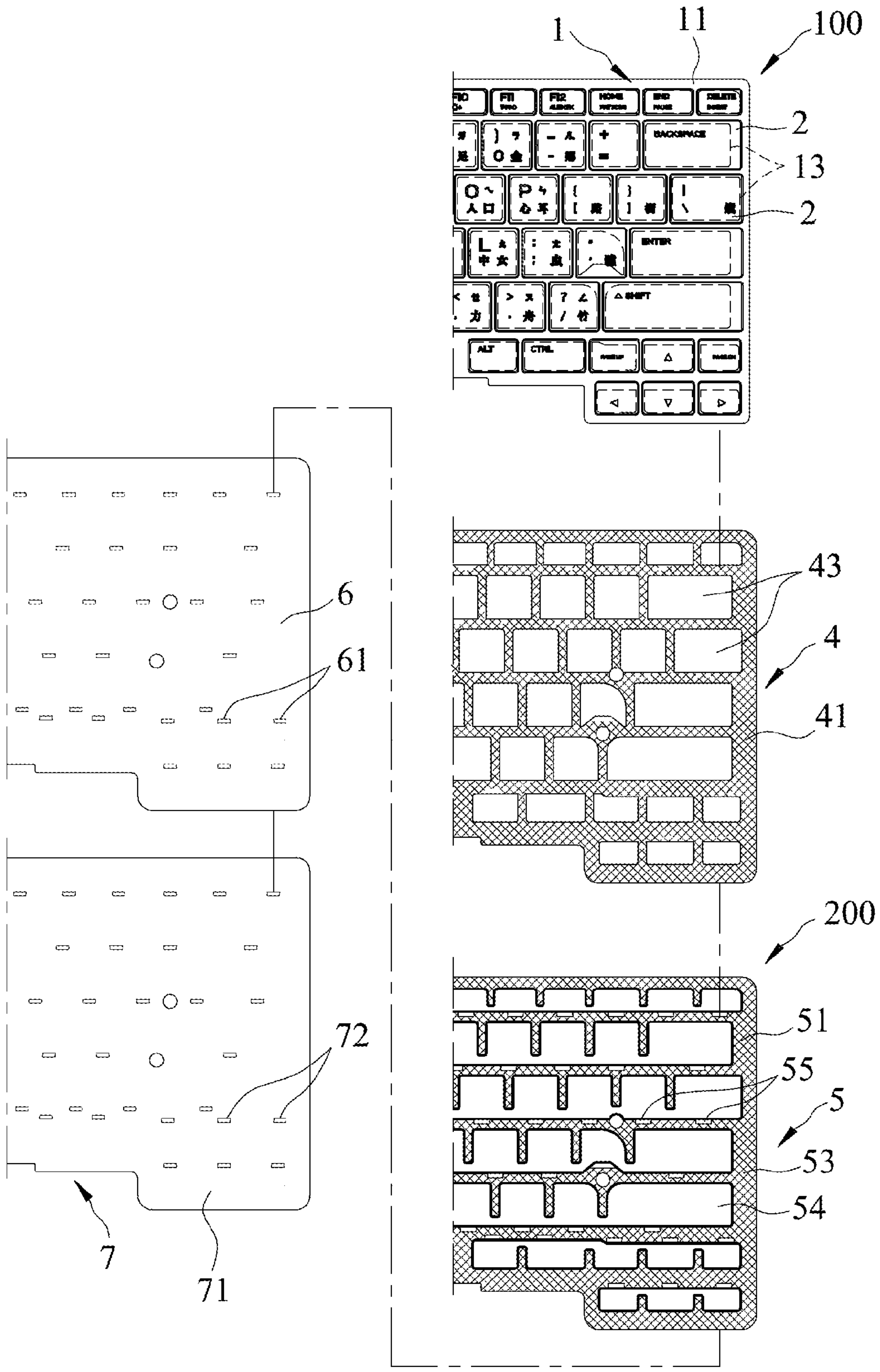
FIG. 3 is a fragmentary exploded top view of the embodiment.

Referring to FIGS. 2 to 5, a light emitting keyboard according to the embodiment of the present disclosure is shown to include a keyboard module 100 and a backlight module 200.

The keyboard module 100 includes a base plate 1, a plurality of keys 2 and a transparent circuit film 3. The base plate 1 has opposite top and bottom surfaces 11, 12, and a plurality of spaced-apart through holes 13 extending through the top and bottom surfaces 11, 12.

The keys 2 are disposed on the top surface 11 of the base plate 1 and are located respectively above the through holes

13. Each key 2 has at least one light transmissive portion 21 facing a corresponding one of the through holes 13. The light transmissive portion 21 of each key 2 is a character/symbol to be displayed by each key 2. The transparent circuit film 3 is disposed on the top surface 11 of the base plate 1 below the keys 2. In this embodiment, each key 2 is movable upward and downward relative to the base plate 1 through a scissors-type support mechanism 22 and a resilient member 23, and contacts the transparent circuit film 3 through the resilient member 23 to generate a trigger signal. Since the assembly and structure of the components of the keyboard module 100 are well known in the art, a detailed description thereof is dispensed herewith for the sake of brevity. Further, the assembly and structure of the components of the keyboard module 100 are also not limited to the aforesaid disclosure.

The backlight module 200 is disposed on the bottom surface 12 of the base plate 1, covers the through holes 13, and is located below the keys 2 for projecting light to the keys 2. The backlight module 200 includes a light shielding plate 4, a light guide plate 5, a light reflecting member 6 and a light emitting unit 7.

The light shielding plate 4 is disposed on the bottom surface 12 of the base plate 1, and includes a top surface 41 facing the bottom surface 12 of the base plate 1, a bottom surface 42 opposite to the top surface 41, and a plurality of light transmissive regions 43 respectively corresponding to the through holes 13.

Figure 4:
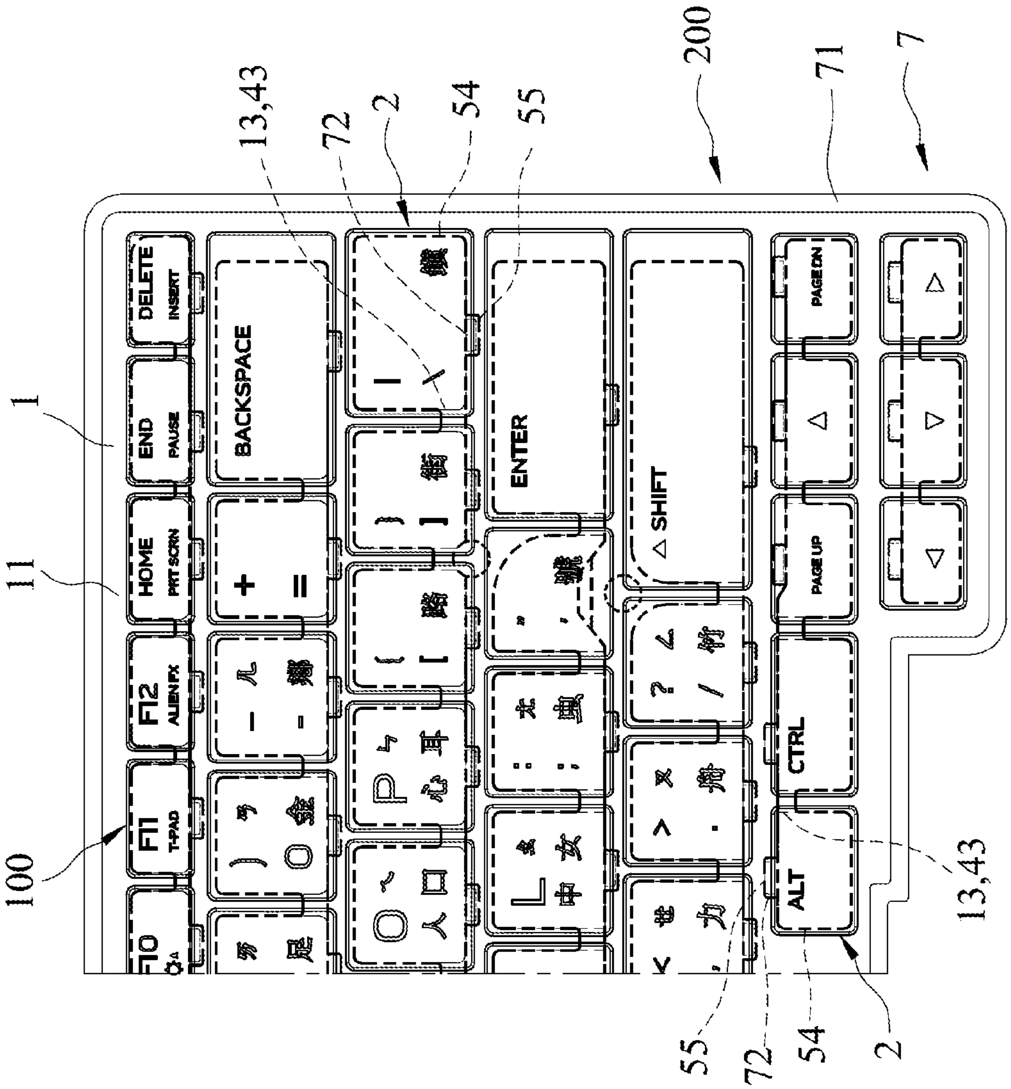
FIG. 4 is a fragmentary top view of the embodiment in an assembled state.
Figure 5:
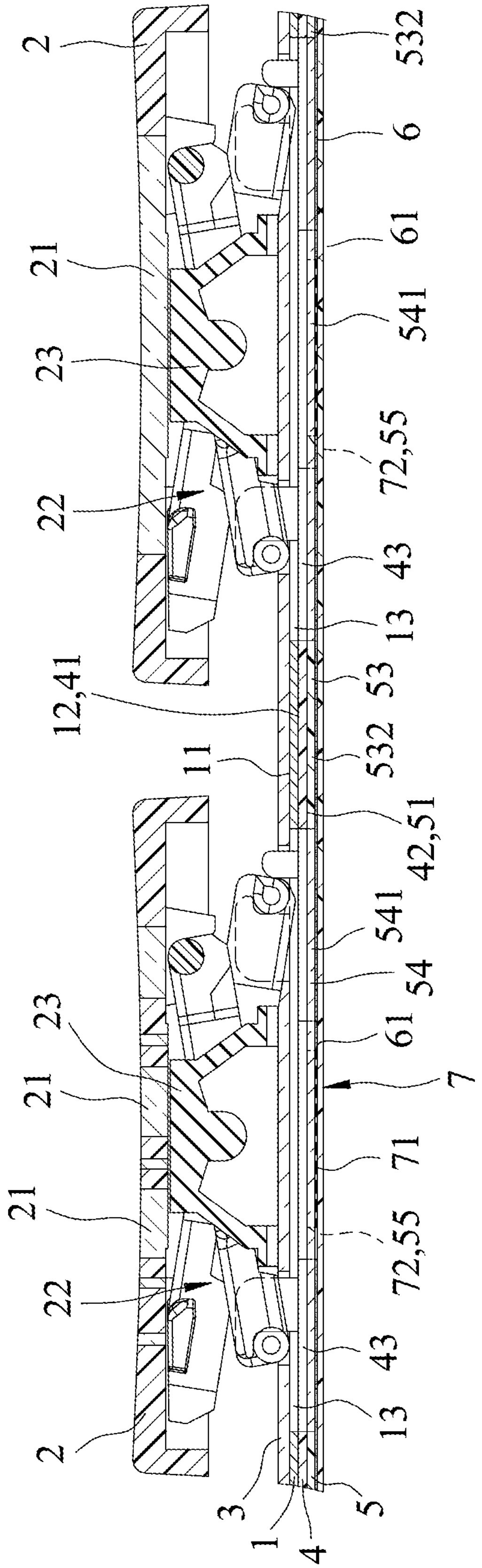
FIG. 5 is an enlarged fragmentary sectional view of the embodiment in the assembled state.
Figure 6:
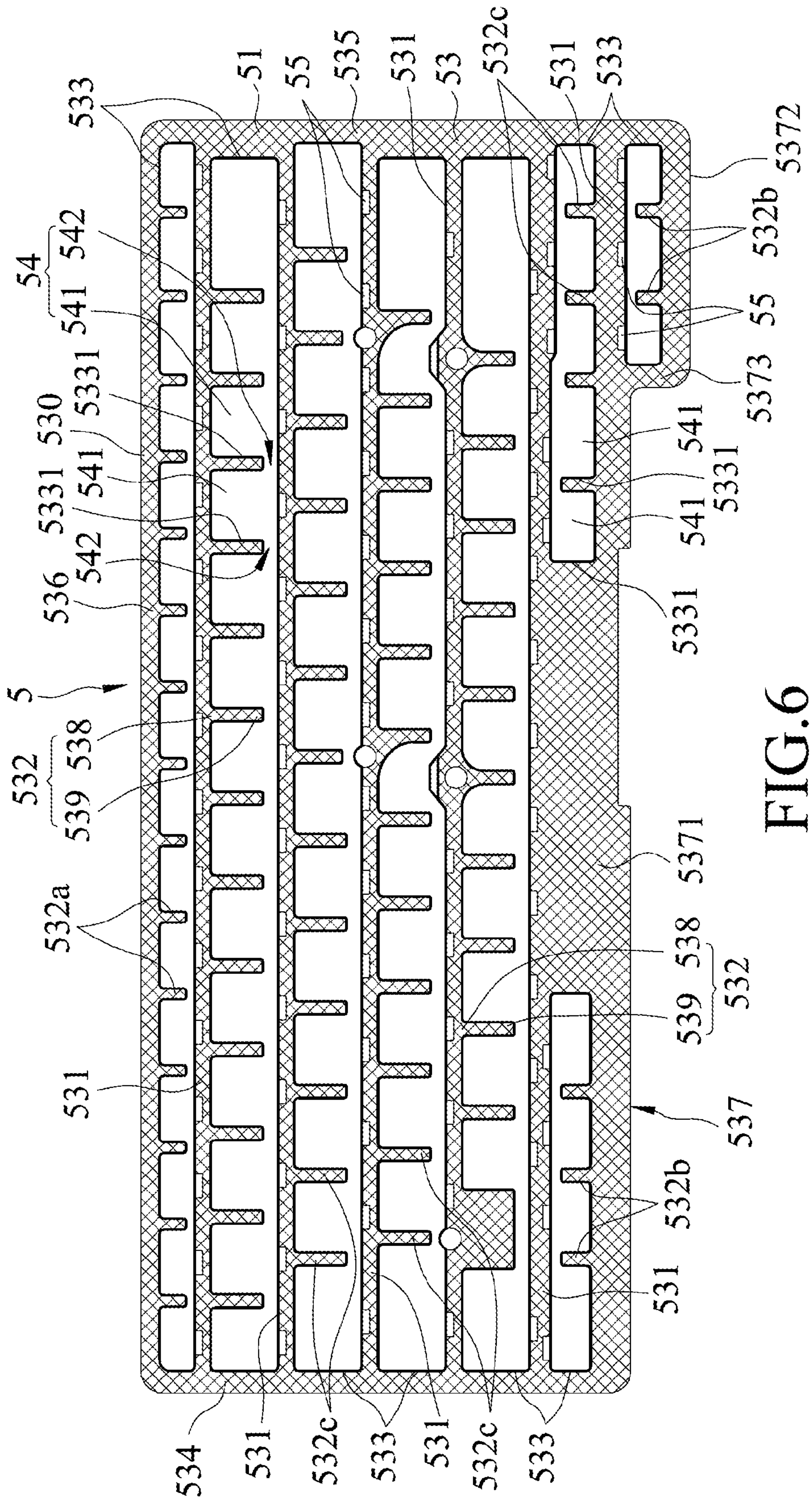
FIG. 6 is a top view of a light guide plate of the embodiment.

With reference to FIGS. 4 to 6, the light guide plate 5 is disposed on the bottom surface 42 of the light shielding plate 4, and has a top surface 51 facing the bottom surface 42 of the light shielding plate 4, and a bottom surface 52 opposite to the top surface 51. The light guide plate 5 includes a light shielding plate body 53, a light guide plate body 54, and a plurality of light source receiving spaces 55.

The light shielding plate body 53 has the top and bottom surfaces 51, 52 of the light guide plate 5, and is made of non-light-transmissive material, such as a black acrylonitrile-butadiene-styrene (ABS) polymer. The light shielding plate body 53 includes a peripheral frame 530 and a plurality of longitudinal and transverse partition strips 531, 532.

The peripheral frame 530 includes opposite left and right walls 534, 535, a rear wall 536 having two opposite ends respectively connected to rear ends of the left and right walls 534, 535, and a front wall 537 having two opposite ends respectively connected to front ends of the left and right walls 534, 535. Each longitudinal partition strip 531 has two opposite ends respectively connected to the left and right walls 534, 535. The longitudinal partition strips 531 divide the peripheral frame 530 into a plurality of rows of light guide spaces 533.

The transverse partition strips 532 includes a plurality of first transverse partition strips (532*a*) connected to the rear wall 536, a plurality of second transverse partition strips (532*b*) connected to the front wall 537, and a plurality of third transverse partition strips (532*c*) connected to a corresponding one of the longitudinal partition strips 531. Each of the first to third transverse partition strips (532*a*, 532*b*, 532*c*) has a connecting end 538 connected to a corresponding one of the rear wall 536, the front wall 537 and the longitudinal partition strips 531, and a free end 539 opposite to the connecting end 538.

Each row of the light guide spaces 533 has a corresponding one of the first to third transverse partition strips (532*a*, 532*b*, 532*c*) therein, and is partitioned by the same into a plurality of light guide regions 5331 that respectively align with the keys 2.

In this embodiment, the front wall 537 has a substantially "Z" shape, and includes a first longitudinal portion 5371, a second longitudinal portion 5372 and an intermediate transverse portion 5373 interconnecting the first and second longitudinal portions 5371, 5372. A frontmost one of the longitudinal partition strips 531 has two opposite ends respectively connected to the right wall 535 of the peripheral frame 530 and a junction between the first longitudinal portion 5371 and the intermediate transverse portion 5373. The connection relationship of the longitudinal partition strips 531 with the peripheral frame 530 may be altered according to the configuration of the keys 2, and is not limited to what is disclosed herein.

The light guide plate body 54 is made of a light transmissive material, such as polycarbonate (PC), and includes a plurality of light guide blocks 541 respectively embedded in the light guide regions 5331, and a plurality of connecting portions 542 each of which is connected between two adjacent ones of the light guide blocks 541. Each connecting portion 542 is embedded between two adjacent ones of the light guide regions 5331 and is located immediately adjacent the free end 539 of the corresponding one of the first to third transverse partition strips (532*a*, 532*b*, 532*c*). The thickness of the light guide plate body 54 is not greater than that of the light shielding plate body 53. The light guide plate body 54 and the light shielding plate body 53 can be made through a bi-injection molding process or an embedded injection molding process. In this embodiment, the light guide plate body 54 and the light shielding plate body 53 have the same thickness, and have flush top surfaces and flush bottom surfaces. However, it is not limited thereto. When the thickness of the light guide plate body 54 is smaller than that of the light shielding plate body 53, the top or bottom surface of the light guide plate body 54 is indented and located in the corresponding light guide region 5331.

The light source receiving spaces 55 respectively correspond to the light guide blocks 541. In this embodiment, the light source receiving spaces 55 are formed in the longitudinal partition strips 531 and respectively face the light guide blocks 541. Each light source receiving space 55 is proximate to a free end 539 of a corresponding one of the first to third transverse partition strips (532*a*, 532*b*, 532*c*). However, it is not limited thereto. The light source receiving spaces 55 may also be formed in the respective light guide blocks 541.

It is worth to mention herein that the free end 539 of each of the first and third transverse partition strips (532*a*, 532*b*) may be connected to an adjacent one of the longitudinal partition strips 531, and the free end 539 of each second transverse partition strip (532*b*) may be connected to a frontmost longitudinal partition strip 531. Further, the first transverse partition strips (532*a*) may extend from a rearmost longitudinal partition strip 531 toward the rear wall 536, and the free ends 539 thereof may be connected to the rear wall 536. Moreover, the light guide plate body 54 may only have the light guide blocks 541 respectively embedded in the light guide regions 5331, and the light source receiving spaces 55 may be provided at any portion of the peripheral frame 530, as long as they may correspond to the light guide blocks 541.

Figure 7:
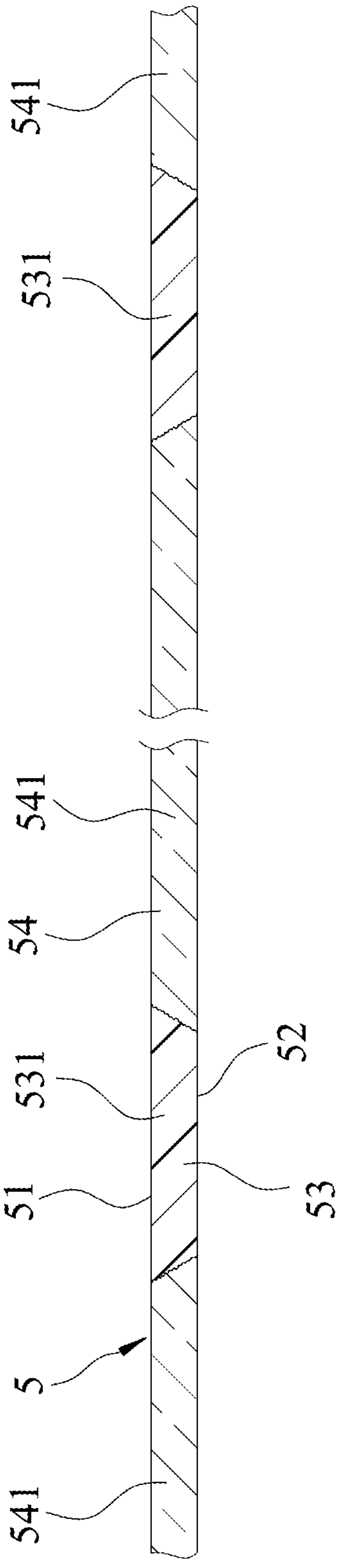
FIG. 7 is a fragmentary sectional view, illustrating a connecting relationship between a light shielding plate body and a light guide plate body of the light guide plate of the embodiment.

Additionally, in order to increase the embedding strength between the light shielding plate body 53 and the light guide plate body 54 so as not to be easily separated from each other, engaging surfaces of the light shielding plate body 53 and the light guide plate body 54 are non-smooth surfaces having a groove and protrusion structure, or are inclined relative to each other, or are rough inclined surfaces (see FIG. 7).

The light reflecting member 6 is disposed on and covers the bottom surface 52 of the light guide plate 5, and has a plurality of light source through holes 61 corresponding to the light source receiving spaces 55. In this embodiment, the light reflecting member 6 is a light reflecting plate. However, it is not limited thereto. The light reflecting member 6 may be a light reflecting film adhered to the bottom surface 52 of the light guide plate 5.

The light emitting unit 7 includes a circuit board 71 disposed on a bottom side of the light reflecting member 6, and a plurality of light sources 72 disposed on the circuit board 71. The light sources 72 respectively extend through the light source through holes 61 and respectively receive in the light source receiving spaces 55. Light emitted by each light source 72 is restricted to transmit within each light guide block 541 by the light shielding plate body 53. In this embodiment, each light source 72 is a side emitting light-emitting diode (LED), and has a light emitting angle of less than 180 degrees.

When the light emitting angle of each light source 72 is determined, the extending configuration of the transverse partition strips 532 and the disposition thereof relative to each light source 72 are obtained by calculation. Thus, light emitted by each light source 72 of this embodiment can be restricted to transmit within each light guide block 541 and will not be transmitted outward through the connecting portion 542 between two adjacent ones of the light guide blocks 541.

From the aforesaid description, it is apparent that through the structural design of the light shielding plate body 53 and the light guide plate body 54 of the light guide plate 5, that is, the light shielding plate body 53 surrounds the light guide blocks 541 of the light guide plate body 54 so that light emitted by each light source 72 can be restricted to transmit within each light guide block 541 and can only be emitted outward through top and bottom surfaces of each light guide block 541. Furthermore, through the cooperation of a light guide block 541 with a light source 72, the luminance of each light guide block 541 is controlled by a single light source 72 and is not affected by the other light sources 72. As such, the luminance of the light guide blocks 541 is uniform and approaches the luminance of each light source 72, so that the luminance of the light transmissive portions 21 of the keys 2 is also uniform. Hence, when the light emitting keyboard of this disclosure is used in a dark place, a user can easily recognize the character/symbol on each key 2.

Moreover, with the peripheral frame 530 of the light shielding plate body 53 surrounding a periphery of the light guide plate body 54, the light guide plate 5 of this disclosure can resolve the existing problem of leakage of light emitted by the light source through a peripheral side of the light guide plate of the conventional light emitting keyboard, so that the light utilization efficiency of each light source 72 can be increased. Through the embedding engagement of the light guide plate body 54 with the light shielding plate body 53, the structural strength of the entire light guide plate 5 can be effectively enhanced, so that assembly among the components of the light emitting keyboard of this disclosure can be facilitated.

In addition, because the light guide plate 5 can restrict the light emitted by each light source 72 to transmit outward only through the top and bottom surfaces of each light guide block 541, the light shielding plate 4 disposed between the keyboard module 100 and the light guide plate 5 and the light reflecting member 6 disposed between the circuit board 71 and the light guide plate 5 may both be dispensed herewith. In this case, the non-light-transmissive circuit board 71 is adhered tightly to the bottom surface 52 of the light guide plate 5, and a peripheral edge of the circuit board 71 is adhered to the peripheral frame 530 of the light guide plate 5, so that the circuit board 71 may achieve the light reflecting effect substantially similar to that of the light reflecting member 6. Through this, the light guide plate 5 can effectively reduce the thickness of the entire backlight module 200. Therefore, the object of this disclosure can be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A light guide plate configured to be disposed on a bottom side of a keyboard module having a plurality of keys, said light guide plate comprising:

a light shielding plate body including a peripheral frame, a plurality of longitudinal and transverse partition strips provided in said peripheral frame, and a plurality of light guide regions cooperatively defined by said peripheral frame and said longitudinal and transverse partition strips, said light guide regions being configured to respectively align with the keys;

a light guide plate body including a plurality of light guide blocks embedded in said light guide regions, respectively; and a plurality of light source receiving spaces corresponding to said light guide blocks.

2. The light guide plate as claimed in claim 1, wherein said peripheral frame includes opposite left and right walls, a rear wall having two opposite ends respectively connected to rear ends of said left and right walls, and a front wall opposite to said rear wall and having two opposite ends respectively connected to front ends of said left and right walls, each of said longitudinal partition strips having two opposite ends respectively connected to said left and right walls, said transverse partition strips including a plurality of first transverse partition strips connected to said rear wall, a plurality of second transverse partition strips connected to said front wall, and a plurality of third transverse partition strips connected to a corresponding one of said longitudinal partition strips.

3. The light guide plate as claimed in claim 2, wherein each of said first to third transverse partition strips has a connecting end connected to a corresponding one of said rear wall, said front wall and said longitudinal partition strips, and a free end opposite to said connecting end, said longitudinal partition strips dividing said peripheral frame into a plurality of rows of light guide spaces, each row of said light guide spaces having a plurality of said light guide regions, said light guide plate body further including a plurality of connecting portions each of which is connected to two adjacent ones of said light guide blocks, each of said connecting portions being embedded between two adjacent ones of said light guide regions and being located immediately adjacent said free end of a corresponding one of said first to third transverse partition strips.

4. The light guide plate as claimed in claim 3, wherein each of said light source receiving spaces is provided between one of said longitudinal partition strips and a corresponding one of said light guide blocks.

5. The light guide plate as claimed in claim 4, wherein said light source receiving spaces are formed in said longitudinal partition strips and respectively face said light guide blocks, each of said light source receiving spaces being proximate to said free end of a corresponding one of said first to third transverse partition strips.

6. The light guide plate as claimed in claim 1, wherein engaging surfaces between said light shielding plate body and said light guide plate body are non-smooth surfaces.

7. The light guide plate as claimed in claim 1, wherein engaging surfaces between said light shielding plate body and said light guide plate body are inclined relative to each other.

8. A light emitting keyboard comprising:

a keyboard module including a base plate, and a plurality of keys disposed on a top surface of said base plate and movable upward and downward relative to said base plate, said base plate having a plurality of through holes corresponding to said keys, said keys being located respectively above said through holes, each of said keys having at least one light transmissive portion facing a corresponding one of said through holes; and a backlight module disposed on a bottom surface of said base plate and including a light guide plate having a light shielding plate body, a light guide plate body and a plurality of light source receiving spaces, said light shielding plate body including a peripheral frame, a plurality of longitudinal and transverse partition strips provided in said peripheral frame, and a plurality of light guide regions cooperatively defined by said peripheral frame and said longitudinal and transverse partition strips, said light guide regions respectively aligning with said keys, said light guide plate body including a plurality of light guide blocks respectively embedded in said light guide regions, said light source receiving spaces corresponding to said light guide blocks, and a light emitting unit including a plurality of light sources respectively received in said light source receiving spaces.

9. The light emitting keyboard as claimed in claim 8, wherein each of said light sources is a side emitting light-emitting diode.

10. The light emitting keyboard as claimed in claim 9, wherein said light emitting unit further includes a circuit board disposed on a bottom side of said peripheral frame, and said light sources are disposed on said circuit board.

* * * * *